United States Patent [19]

Thornbery

[11] E Re. 30,076

[45] Reissued Aug. 21, 1979

[54] FOUR-WAY REVERSING VALVE WITH DIFFERENTIAL AREA OPERATOR

[75] Inventor: James M. Thornbery, Milwaukee, Wis.

[73] Assignee: The Singer Company, New York, N.Y.

[21] Appl. No.: 703,840

[22] Filed: Jul. 9, 1976

Related U.S. Patent Documents

Reissue of:

[64] Patent No.: 3,894,561
Issued: Jul. 15, 1975
Appl. No.: 450,984
Filed: Mar. 14, 1974

[51] Int. Cl.[2] ..... F16K 31/363

[52] U.S. Cl. ..... 137/625.29; 137/625.43; 251/31

[58] Field of Search ..... 62/324, 160; 137/625.29, 625.64, 625.43; 251/31; 137/599.1

[56] References Cited

U.S. PATENT DOCUMENTS

| | | | |
|---|---|---|---|
| 2,916,051 | 12/1959 | Taylor | 137/625.64 |
| 2,920,653 | 1/1960 | Wolff | 137/599.1 X |
| 3,448,959 | 6/1969 | McHale et al. | 137/625.29 X |

*Primary Examiner*—William E. Wayner
*Attorney, Agent, or Firm*—Bayard H. Michael

[57] ABSTRACT

The four-way reversing valve is utilized in refrigerating systems for heat pump applications to interchange the heating and cooling effects of the evaporator and condenser. The three-way pilot valve controls application of high or low system pressure to the end of the chamber adjacent the large piston. The different areas of the two pistons result in movement of the slide valve to the left (both modifications) when high pressure is applied and to the right when low pressure is applied.

3 Claims, 4 Drawing Figures

FOUR-WAY REVERSING VALVE WITH DIFFERENTIAL AREA OPERATOR

Matter enclosed in heavy brackets [ ] appears in the original patent but forms no part of this reissue specification; matter printed in italics indicates the additions made by reissue.

BACKGROUND OF THE INVENTION

Reversing valves for heat pump systems are old with the most successful design being that shown in U.S. Pat. No. 2,976,701. That design relies upon a controlled leakage and can be disabled by dirt. The design requires careful manufacture.

SUMMARY OF THE INVENTION

The object of this invention is to provide a four-way valve which is reliable in operation, competitive in cost, has tolerance to system dirt, and can be manufactured easily with reduced tolerance requirements.

DESCRIPTION OF THE PREFERRED EMBODIMENTS

Figure 1:
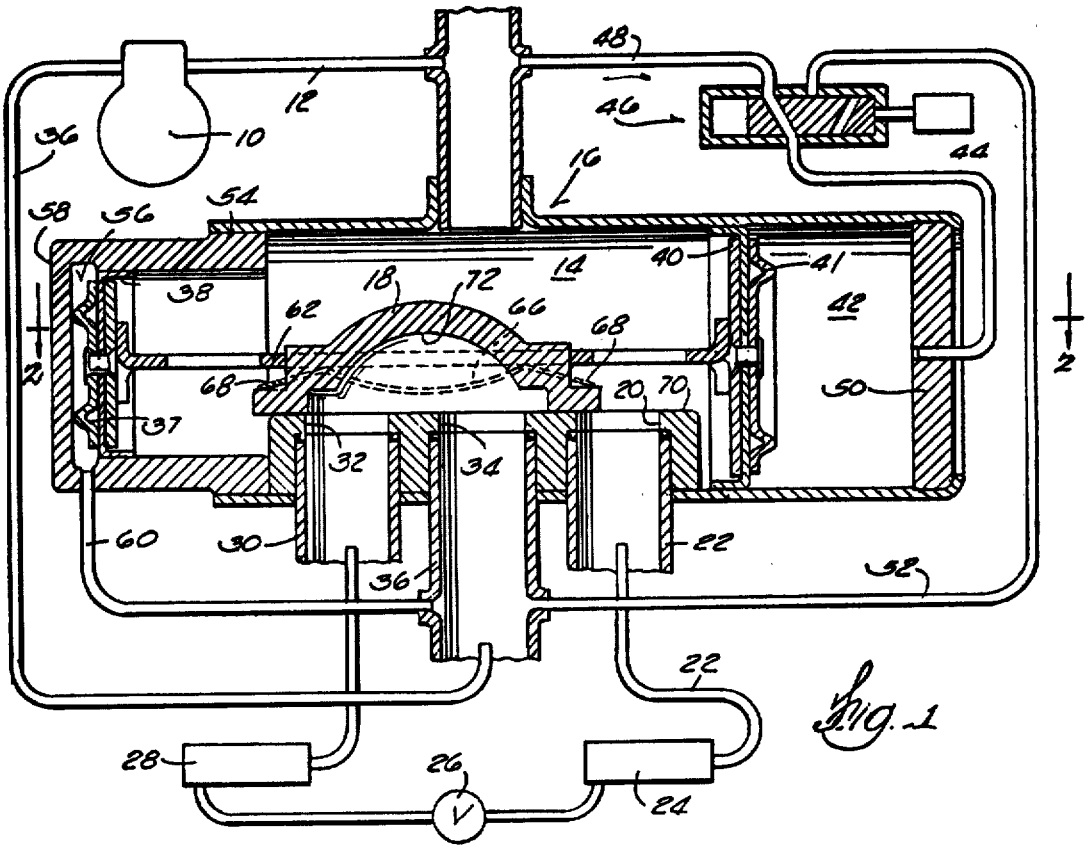
FIG. 1 is a vertical section through the preferred four-way valve with the system shown schematically.
Figure 2:
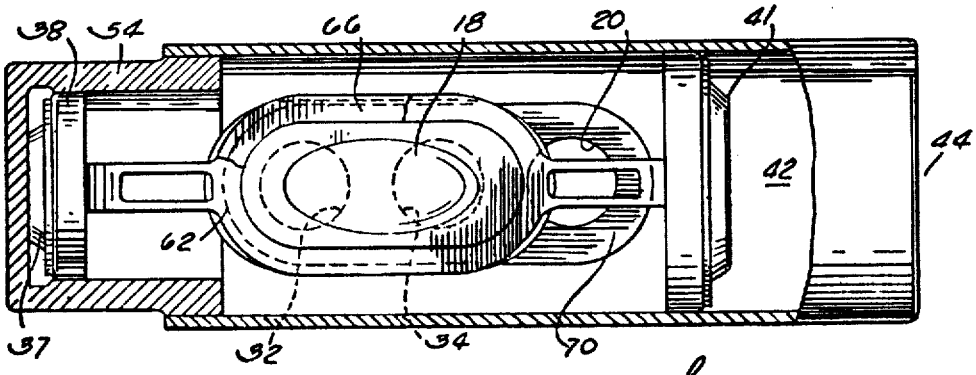
FIG. 2 is a horizontal section showing the manner in which the pistons are connected to each other and to the slide valve.

In the system shown in FIG. 1 compressor 10 delivers hot refrigerant through conduit 12 to the slide valve chamber 14 in the reversing valve body 16. With the slide valve 18 in the position shown, the hot gas is delivered to outlet 20 and conduit 22 leading to the condenser 24. Flow from the condenser 24 may be regulated by any suitable valve 26 to the evaporator 28 and flow from the evaporator goes through conduit 30 to port 32 below the slide valve 18 with the slide valve directing the flow to outlet 34 for return to the compressor 10 through conduit 36. Under these conditions the condenser 24 is hot and the evaporator 28 is cold. When the flow is reversed, as explained more fully hereafter, the functions of the evaporator and condenser are reversed with the result that the formerly cold evaporator becomes hot and thus is suitable for heating the space rather than cooling the space.

The reversing valve 16 has a central chamber 14 in which the slide valve 18 is mounted. The operation of the slide valve is controlled by the two pistons 38, 40 which are of unequal size and interconnected for movement as a unit. Pressure in chamber 42 between the piston 40 and the cylinder head 50 is supplied through conduit 44 from either the high pressure or low pressure in accordance with the position of the three-way valve 46. In the position shown, high pressure is supplied from conduit 12 through conduit 48, the three-way valve 46, and conduit 44. Thus high pressure acts on both sides of piston 40 in the position shown in FIG. 1 with no net force tending to move piston 40. When three-way valve 46 is actuated, low pressure is supplied to chamber 42 from conduit 36 through conduit 52, the three-way valve 46 and conduit 44. This results in a net force across piston 40 urging it to the right.

The left end of the valve body 16 is provided with a reduced diameter cylinder 54 with chamber 56 between piston 38 and cylinder head 58. The pressure in chamber 56 is always at low pressure conditions, being connected to conduit 36 through conduit 60. The two pistons are interconnected by the rod 62 which has an oblate portion 64 straddling slide valve 18 and connecting the rod to the valve so the piston motion will be transferred to the valve. An oblate spring 66 underlies rod portion 64 with the spring being in the general shape of an M as seen in FIG. 1. The ends of the spring bear against the ledges 68 at either end of the slide valve and the two humps of the spring bear against the underside of the rod 64 so the slide valve 18 is held against the flat surface 70 through which the ports 32, 34 and 20 are bored. It should be noted that the size of the cavity 72 in the slide valve and the projection of ledges 68 are important to achieve proper timing of the valve to prevent the system pressure being equalized during movement of the valve. Should that occur, the actuating forces on the piston assembly would be neutralized and the valve would hang up.

In the position shown in FIG. 1, there is equal pressure on each side of piston 40 as noted before. There is a pressure differential across the small piston 38, however, with high side pressure in chamber 14 and low side pressure in chamber 56. Therefore, the small piston has a force acting on it moving it left and the piston assembly is held in the piston shown. If the three-way valve 46 is actuated to provide low pressure to the chamber 42, there is now high to low pressure acting across piston 40 just as there is across the small piston 38. Since the large piston has approximately twice the area of the small piston, the net effect is a pressure derived force actuating interconnected pistons and the slide valve 18 to the right so that flow to the condenser 24 and evaporator 28 is reversed resulting in a reversal of function so the evaporator 28, which was cold, now becomes hot and can be used for heating a space rather than cooling the space.

Both piston heads are provided with bosses or pads 37,41 (small and large pistons, respectively, which engage the cylinder heads to act as stops limiting movement of the piston assembly.

Figure 3:
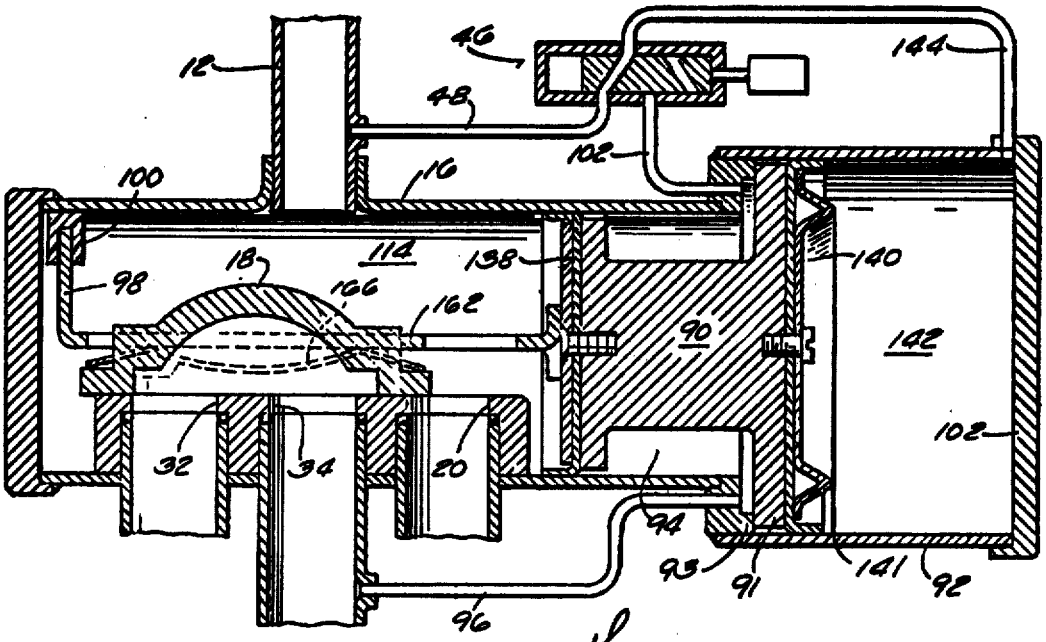
FIG. 3 is a vertical section through another modification of the four-way valve.
Figure 4:
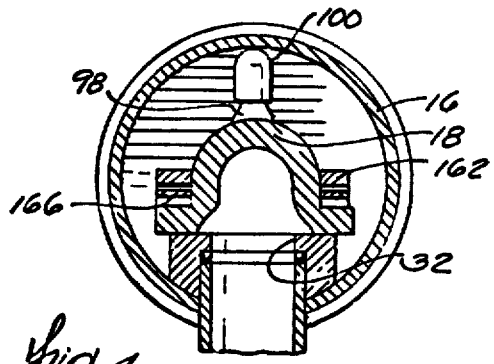
FIG. 4 is a section on line 4—4 of FIG. 3 (but can be considered a similar section in FIG. 1).

The modification of FIG. 3 is not as desirable as that of FIG. 1 because it is more expensive to manufacture, but it illustrates the fact that there are variations possible in the construction. In this arrangement the small diameter piston 138 and the large diameter piston 140 are interconnected by spindle 90 with the chamber 94 at low system pressure supplied by conduit 96. The larger diameter cylinder 92 is mounted on the right end of the main body 16 with ring 93 interconnecting the two. Flange 91 of the spindle 90 engages the ring 93 as illustrated in FIG. 3 to limit the movement of the piston assembly to the left.

Low pressure is provided to chamber 94 through conduit 96 at all times and can be communicated to chamber 142 between piston 140 and cylinder head 102 if the position of the three-way valve 46 is reversed from that illustrated. As illustrated, high side pressure is communicated through conduit 148, the three-way valve 46, and conduit 144 to chamber 142. This, then, has a high side pressure acting in chamber 142 as well as in slide valve chamber 114. The low pressure in chamber 94 is of no effect and, therefore, the net force acting on the piston assembly is to the left to the position shown.

The piston assembly is connected to the slide valve 18 by means of rod 162, the left end of which is upturned at 98 and provided with a Nylon (or other low friction material), pad 100 which prevents deflection of the rod under the force of spring 166 which acts between rod 162 and the slide valve 18 in the same manner as in FIG. 1.

If the three-way valve is now actuated, low pressure will be supplied to chamber 142. This results in a net effect of the high pressure in chamber 114 acting against low pressure in chamber 142 and, therefore, the valve assembly will move to the right to the limit determined by engagement of the boss 141 with the cylinder head 102.

The pressure differential required to initiate movement is about 10 psi which is readily attainable in an operating refrigerant system. The force which must be overcome is the static friction load.

I claim:

1. A reversing valve comprising, a body including a valve chamber, a high pressure inlet to the chamber, a low pressure outlet from the chamber, and a pair of ports adjacent the outlet, a slide valve in the chamber movable between two positions in which it serves to connect either of said ports to said outlet while the other port communicates with the chamber, said body including a large diameter cylinder and a small diameter cylinder, a piston in each cylinder, the pistons being interconnected and being connected to the slide valve, means supplying a constant pressure to the space between the pistons, one side of the smaller piston being exposed to the chamber pressure and the other side of the smaller piston being [exposed to low pressure] *connected to said low pressure outlet* so there is always a pressure differential acting across the smaller piston, means [supplying high or low pressure to] *for selectively connecting* the space between the larger piston and the head of the larger cylinder *to high pressure or to the low pressure outlet* to cause the pistons and slide valve to move between said positions by reason of the pressure differential acting across the small piston area in one position and by reason of the pressure differential across the difference in piston areas in the other position.

2. A valve according to claim 1 in which the valve chamber is between the pistons.

3. A valve according to claim 1 in which both pistons are located at one end of the valve chamber and the space between the pistons is at low pressure.

* * * * *